Oct. 19, 1926.

A. E. YOUNG 1,603,930

CONVEYING APPARATUS

Filed Sept. 17, 1924   4 Sheets-Sheet 1

Inventor
Albert Edward Young,
by
Attys

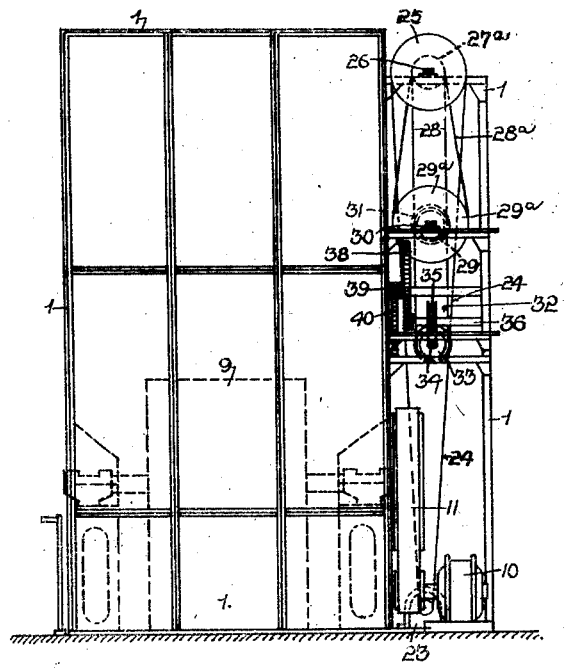

Oct. 19, 1926.  
A. E. YOUNG  
1,603,930  
CONVEYING APPARATUS  
Filed Sept. 17, 1924 4 Sheets-Sheet 4

Inventor  
Albert Edward Young,  
by  
Atty̆s.

Patented Oct. 19, 1926.

1,603,930

UNITED STATES PATENT OFFICE.

ALBERT EDWARD YOUNG, OF LIVERPOOL, ENGLAND.

CONVEYING APPARATUS.

Application filed September 17, 1924, Serial No. 738,316, and in Great Britain July 2, 1923.

This invention relates to the continuous conveying of articles or fabrics, such, for instance as hides of leather, leather and rubber substitutes, linoleum and textile materials, in a closed chamber within which air or other gaseous fluids are circulated.

It has been proposed to mechanically convey leather, yarn, textile and other materials, through a treatment chamber suspended from pole or rod-carriers which, during the inward motion travel on the lower track of an endless chain conveyer provided with spaced projections, and, during the outward motion, travel on the upper track of said conveyer, the transfer of said poles or rods from the lower to the upper conveyer track at the inner end of the chamber being accomplished by an endless chain elevator also provided with spaced projections; and the lowering and feeding of said poles or rods at the outer end of the chamber from the upper to the lower track of said conveyer being accomplished by the aid of pocketed transfer wheels and feed discs provided with recesses equal in number to the pockets of said transfer wheels.

Apparatus according to my invention, for continuously conveying articles or fabrics suspended from pole or rod-carriers through a closed chamber, comprises, in combination, a chain, or like conveyer, provided with spaced projections, and the upper track whereof is adapted—when the apparatus is in motion—to move pole or rod-carriers inward through the chamber, whilst its lower track moves pole or rod-carriers outward through the chamber; an endless chain or like elevator, provided with spaced and relatively long and short projections, disposed at the feed end of said chamber, adapted to raise pole or rod-carriers to the upper track of the conveyer; a leading recess formed in the lower race of said elevator, whereby said pole or rod-carriers may be unloaded, and a displaceable stop located in said race adjacent to said loading recess; transfer platform disposed adjacent to the upper end of said elevator; a second set of transfer platforms disposed adjacent to the inner end of the upper track of said conveyer, said transfer platform being of such contour as to receive and retain pole or rod-carriers from said elevator and conveyer, for engagement by the upper track of conveyer and transfer wheels each respectively; transfer wheels disposed at the inner end of said chamber, and provided with pockets formed by relatively short and long radial projections adapted by the aid of the predetermined contour of said second mentioned transfer platforms to ensure the deposit of a pole or rod-carrier in the pockets by the action of the noses of said transfer platforms and the shorter radial projections, so that the pole is lowered and carried to the lower track of the conveyer whereby it is delivered to the lower race of the elevator, and there held by said displaceable stop until carried by the short projection of the elevator to said loading recess, where it remains until carried by the longer projection of the elevator to the first mentioned transfer platform.

In the example now to be given apparatus is provided for conveying articles or fabrics suspended from poles through a closed chamber, the conveyer portion of which, constructed in this instance of two endless chains, is provided with projections spaced say every three links and its upper track moves the loaded poles inward whilst simultaneously the lower track moves poles outward through the gaseous fluid being circulated within the chamber.

At the feed end of the apparatus an elevator is disposed constructed, in this instance, of two endless chains each having one relatively long and one shorter projection. The larger projections together raise one pole per cycle from a loading recess, formed in the lower race, to the upper track of the conveyer, whilst the shorter projections, following say six feet behind the longer, together bring a pole from a displaceable stop, located in the lower race, to said loading recess.

Adjacent to the upper end of the elevator is disposed a set of contoured transfer platforms the foremost portion of which is inclined relative to the upper race of the elevator, in order to disengage a pole from said elevator and an after recessed portion retains said pole until engaged by the conveyer.

At the inner end of the upper track of the conveyer is disposed a second set of contoured transfer platforms somewhat similar to the foregoing set in that the foremost portions are inclined relative to the upper track of the conveyer, in order to disengage a pole from the conveyer and recessed portions retain said pole until engaged by the transfer wheels, but in addition the nosed portions at the aftermost ends are inclined in order to raise the pole over the short lugs of the transfer wheel into the pockets formed between said short lugs and the longer lugs of said transfer wheels.

Disposed at the inner end of the chamber is a transfer appliance consisting in this instance of two wheels on the rim of each of which, separated by intervals of 120°, are fixed three pairs of lugs forming pockets and the forward lug of each pair is somewhat shorter than the following lug in the direction of motion to facilitate engagement of a pole from the transfer platforms as described. During their downward motion the poles are maintained close to the rims of the transfer wheels by guides until delivered to the lower track of the conveyer. The conveyer in turn carries the poles to the lower race of the elevator for successive retention by the displaceable stop and movement by the short projections of the elevator to the loading recess.

I will further describe my invention with the aid of the accompanying sheets of explanatory drawings, which illustrate, by way of example only, one mode of embodying same.

In said drawings:—

Figs. 1 and 2 are, respectively, part-sectional elevation and end elevation of apparatus for the treatment of articles or fabrics;

Figure 1:
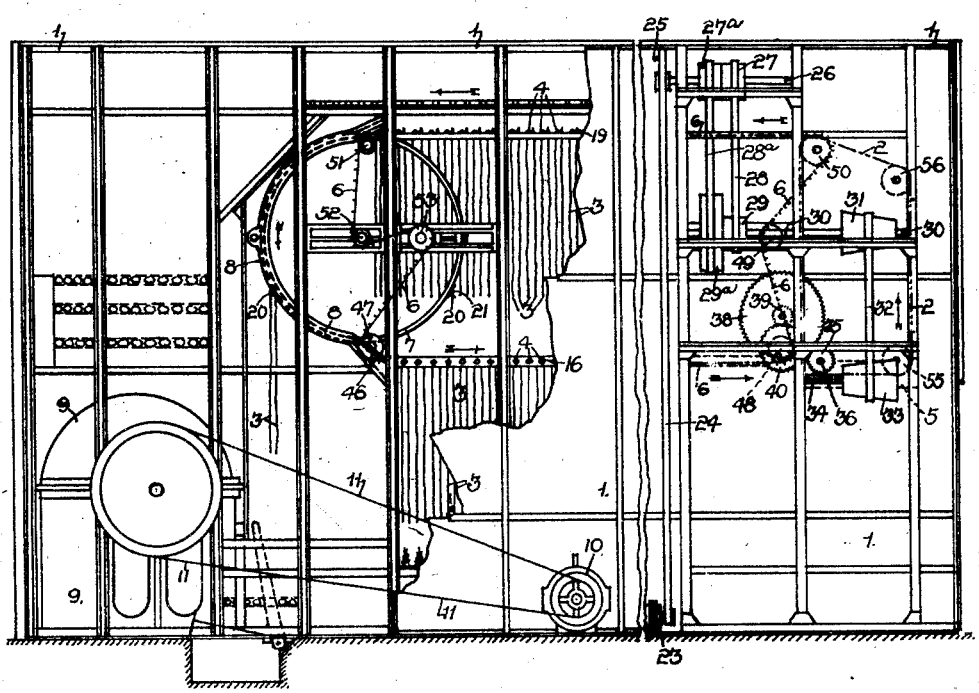

Referring to Figs. 1 and 2 and Figs. 4 and 5 of the drawings, 1 designates a closed chamber within which articles or fabrics may be treated by gaseous fluids; 2 is an elevator consisting of endless chains preferably two disposed one at each inner side of the chamber by means of which fabrics 3 suspended from pole or rod-carriers 4 are successively raised from a contoured loading recess 5 to the upper track of a conveyer 6 consisting of a like number of endless chains and normally arranged to be continuously moving.

At the inner end of conveyer 6 is situated a transfer appliance consisting of two or more pocketed wheels 7 onto which the loaded poles 4 are, in turn, carried; 8 indicates a race for maintaining the course to be taken by said poles 4 when they are being held between the respectively long and short projections 20, 21 secured to wheels 7 as said wheels rotate.

On arriving at the lowest point on the wheels 7 the poles 4 are, with their loads, successively tranferred directly on to the lower track of the conveyer 6 for return to the recess 5 of the lower elevator race 15.

Attached to each chain of the elevator 2 is one short lug 12 and one long lug 13. Each shorter lug is such as to move a pole 4 from the displaceable stop 14ª in race 15 to the loading recess 5 from whence it is elevated by the engagement of the longer lug 13.

14 is the counter-balanced lever in one with displaceable stop 14ª which stop retains a pole 4 in the lower elevator race 15 after it has been expelled by the lower track of conveyor 6 from the lower conveyer race 16. The short lug 12 at the predetermined instant thrusts the pole 4 past the end of the stop 14ª into the recess 5 of lower elevator race 15 ready to be taken up by the long lugs 13 on the next cycle; 17 is an upper race for retaining the pole in the elevator during the ascent.

Adjacent to the upper end of elevator 2 are transfer platforms 18 designated to guide each successive pole 4 from the elevator 2 on to the conveyer 6 to be carried forward by consecutive spaced lugs 19, the noses 18ª of the said platforms 18 retain each succeeding pole until engaged by the respective lugs 19 secured to conveyer 6. In the example given, it is arranged that for one carrier pitch movement of the conveyer 6 elevator 2 shall make one complete cycle, thus depositing on conveyer 6 one pole per cycle.

Three pairs of said long and short lugs 20, 21 are provided on the wheel 7 at spaced intervals.

As the poles 4 move in the direction of the arrow (Figs. 4 and 5) they are successively carried to a set of transfer platforms 22 secured to the chamber adjacent to the inner end of the upper track of said conveyer and are retained by the noses 22ª thereof until engaged by the respectively long and short lugs 20, 21 of wheel 7. The shorter lug 20 of each pair first moves a pole 4 towards the summit of nose 22ª thereby causing the pole 4 to pass over said short lug 20 into the pocket formed by the pair of lugs.

Motion is transmitted to the conveyer 2 from electric motor 23 (Fig. 1) by belt 24, pulley 25, shaft 26, pulley 27, belt 28, pulley 29, (or, alternately, pulley 27ª, belt 28ª, and pulley 29ª), shaft 30, cone pulley 31, belt 32, cone pulley 33, worm 34, worm wheel 35, and driving pulley 54 (Fig. 4) on shaft 36.

Motion (reduced) is transmitted to conveyer 6 (Fig. 4) from pinion 37 on shaft 36, by spur wheel 38, pinion 39 and spur wheel 40.

The endless chains of said conveyer 6 pass from toothed driving pulleys 48 mounted on the same shaft as spur wheel 40 upward over tension pulleys 49 (slotted to allow the lugs 19 to pass freely over same) to pulleys 50. From pulleys 50 the conveyer chains pass over pulleys 51, to toothed driving pulleys 52 thus rotating the transfer wheels 7, thence by tension pulleys 53 (similar to pulleys 49) and pulleys 47 to pulleys 48.

The endless chains of elevator 2 pass from the toothed driving pulleys 54 mounted on shaft 36 to pulleys 55, whence they pass upward to pulleys 56 and pulleys 57 to return again over the weighted tension pulleys 58 to the driving pulleys 54.

Simultaneous with the projection of the articles or fabrics 3 through the closed chamber 1, the gaseous fluid required for the treatment, such, for instance, as ozonized air from a generator, is mechanically circulated around said articles or fabrics by means of a turbo-blower 9 located within said chamber. Said turbo-blower 9 is driven by an electric motor 10 through belt transmission 11 situated outside of the chamber 1.

Figure 3:
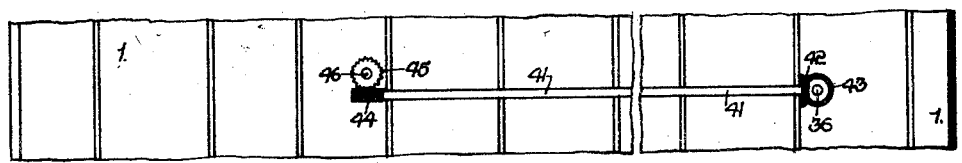
Fig. 3 is a modified detail of a part of the driving mechanism.
Figure 4:
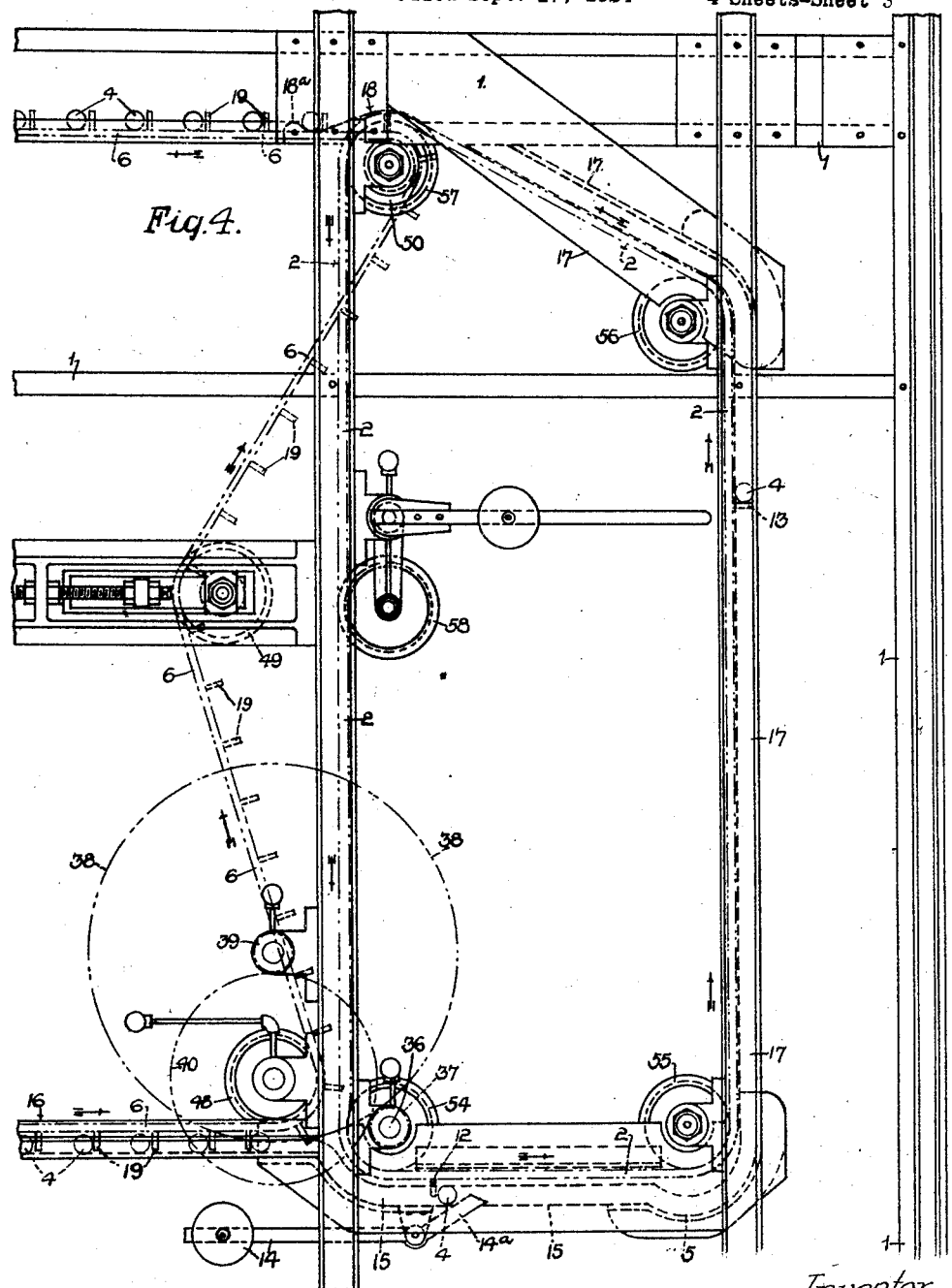
Fig. 4 is an enlarged view of elevator end of the apparatus.
Figure 5:
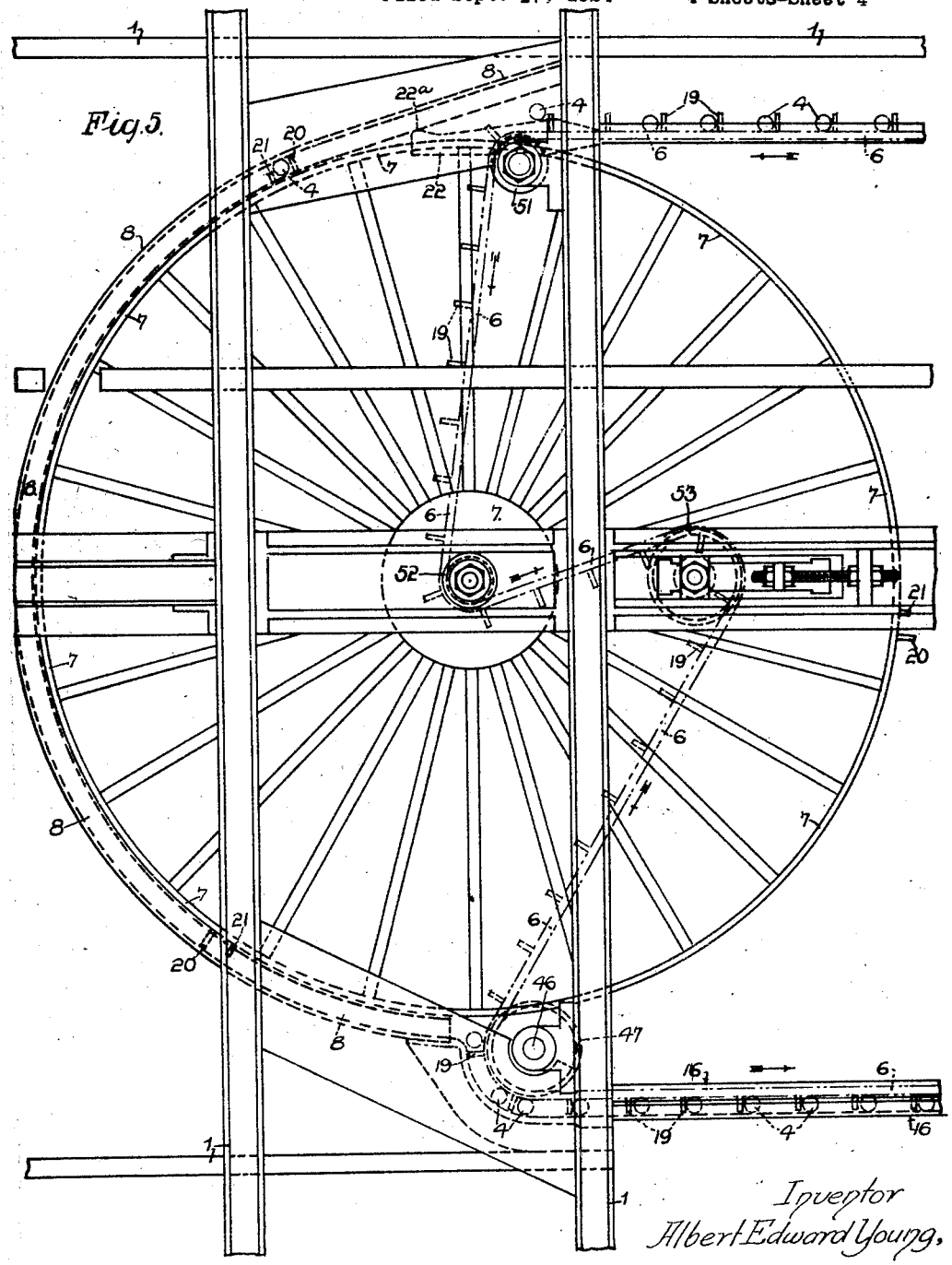
Fig. 5 is an enlarged view of the inner end of the apparatus showing the transfer appliance.

Referring now to the modification shown in Fig. 3, the desired travel ratio between the elevator 2 and (both ends) of the conveyer 6 may be positively effected by means of a shaft 41 provided at one end with a bevel wheel 42 meshing with bevel wheel 43 secured on shaft 36, and having at the other end a worm 44 which meshes with a worm wheel 45 mounted on shaft 46 which is provided with driving pulleys 47 for conveyer 6. The arrangement illustrated being only necessary where the goods to be dealt with are exceptionally heavy, or in cases where light goods are to be dealt with in a length machine.

What I claim is:

Apparatus for continuously conveying articles suspended from pole-carriers through a closed chamber, comprising, in combination, a conveyer having upper and lower tracks, projections carried by said conveyer and adapted to move pole-carriers at the upper track inward through the chamber, whilst its lower track moves pole-carriers outward through the chamber; an endless elevator, provided with spaced and relatively long and short projections, disposed at the feed end of said chamber; a loading recess formed in the lower face of said elevator, and a displaceable stop located in said race; transfer platforms disposed adjacent to the outer end of the upper track of said elevator; a second set of transfer platforms disposed adjacent to the inner end of the upper track of said conveyer, said transfer platforms being of such contour as to receive and retain pole-carriers from said elevator and conveyer, respectively; transfer wheels disposed at the inner end of said chamber, and provided with pockets formed by relatively short and long radial projections adapted by the aid of the predetermined contour of said second mentioned transfer platforms to ensure the deposit of a pole-carrier in a pocket, so that the pole is lowered and carried to the lower track of the conveyer whereby it is delivered to the lower race of the elevator, being held by said displaceable stop until carried by the short projections of the elevator to said loading recess, where it remains until carried by the longer projections of the elevator to the first mentioned transfer platform.

Signed at Liverpool, in the county of Lancaster, England this 20th day of June 1924.

ALBERT EDWARD YOUNG.